US008080086B2

(12) United States Patent
Graber et al.

(10) Patent No.: US 8,080,086 B2
(45) Date of Patent: *Dec. 20, 2011

(54) STATIC DISSIPATIVE FILTRATION MEDIA

(75) Inventors: Julie Graber, Fosteria, OH (US); Gary L. Rickle, Wharton, OH (US); Michael J. Monnin, Tipp City, OH (US)

(73) Assignee: Kuss Filtration Inc., Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/043,776

(22) Filed: Mar. 9, 2011

(65) Prior Publication Data

US 2011/0155658 A1    Jun. 30, 2011

Related U.S. Application Data

(63) Continuation of application No. 12/062,222, filed on Apr. 3, 2008, now Pat. No. 7,927,400.

(51) Int. Cl.
*B03C 3/30* (2006.01)

(52) U.S. Cl. .................. 95/59; 55/485; 55/486; 55/487; 55/528; 55/DIG. 39; 96/17; 96/69; 210/243

(58) Field of Classification Search ................ 96/15, 17, 96/69; 95/59; 55/485–487, 527, 528, DIG. 5, 55/DIG. 39; 210/243
See application file for complete search history.

(56) References Cited

U.S. PATENT DOCUMENTS

| | | | |
|---|---|---|---|
| 4,231,768 | A | 11/1980 | Seibert et al. |
| 4,270,933 | A | 6/1981 | Meny et al. |
| 5,324,579 | A | 6/1994 | Sassa et al. |
| 5,368,913 | A | 11/1994 | Ortega |
| 5,380,432 | A | 1/1995 | Brandt |
| 5,527,569 | A | 6/1996 | Hobson et al. |
| 5,698,148 | A | 12/1997 | Asher et al. |
| 5,776,608 | A | 7/1998 | Asher et al. |
| 5,902,480 | A | 5/1999 | Chilton et al. |
| 5,952,099 | A | 9/1999 | Asher et al. |
| 6,004,462 | A | 12/1999 | Yamada et al. |
| 6,048,614 | A | 4/2000 | Rohrbach et al. |
| 6,099,726 | A | 8/2000 | Gembolis et al. |
| 6,117,802 | A | 9/2000 | Rohrbach et al. |
| 6,204,317 | B1 | 3/2001 | Lilly |
| 6,464,870 | B1 | 10/2002 | Castellanos et al. |
| 6,613,227 | B2 | 9/2003 | Rickle |
| 6,942,711 | B2 | 9/2005 | Faulkner et al. |
| 7,125,434 | B2 | 10/2006 | Yavorsky et al. |
| 7,927,400 | B2 * | 4/2011 | Graber et al. ............... 95/59 |
| 2001/0039879 | A1 | 11/2001 | Chapman |
| 2001/0042361 | A1 | 11/2001 | Cox et al. |
| 2003/0037675 | A1 | 2/2003 | Gillingham et al. |
| 2006/0266701 | A1 | 11/2006 | Dickerson et al. |
| 2007/0028767 | A1 | 2/2007 | Choi et al. |
| 2009/0249951 | A1 * | 10/2009 | Graber et al. ............... 95/69 |

FOREIGN PATENT DOCUMENTS

WO        92/04097        3/1992

OTHER PUBLICATIONS

International Search Report of PCT/US2009/032956, dated Dec. 7, 2009 (3 pages).

(Continued)

*Primary Examiner* — Richard L Chiesa
(74) *Attorney, Agent, or Firm* — Hamre, Schumann, Mueller & Larson, P.C.

(57) ABSTRACT

A filtration media that incorporates a static dissipative media layer for dissipating the static charge that builds up as a fluid, such a fuel, passes through the filtration media. The filtration media includes a filter media suitable for filtering fluid, and a static dissipative media layer. The static dissipative media layer has a surface resistivity level that is sufficient to classify the media layer as static dissipative rather than conductive.

29 Claims, 6 Drawing Sheets

OTHER PUBLICATIONS

Written Opinion of the International Searching Authority of PCT/US2009/032956, dated Dec. 7, 2009 (6 pages).
Bensch et al., "Overcoming Electrostatic Charge Generation Incorporating a Novel Filter Media," Practicing Oil Analysis, Jan.-Feb. 2006, p. 14, 16-18.

"ESD Help Desk: Understanding the Resistivity of Materials," Obtained Jul. 7, 2008 from Compliance Engineering website: http://www.ce-mag.com/archive/2000/novdee/esdhelp.html. Originally published Compliance Engineering, Nov.-Dec. 2000.

* cited by examiner

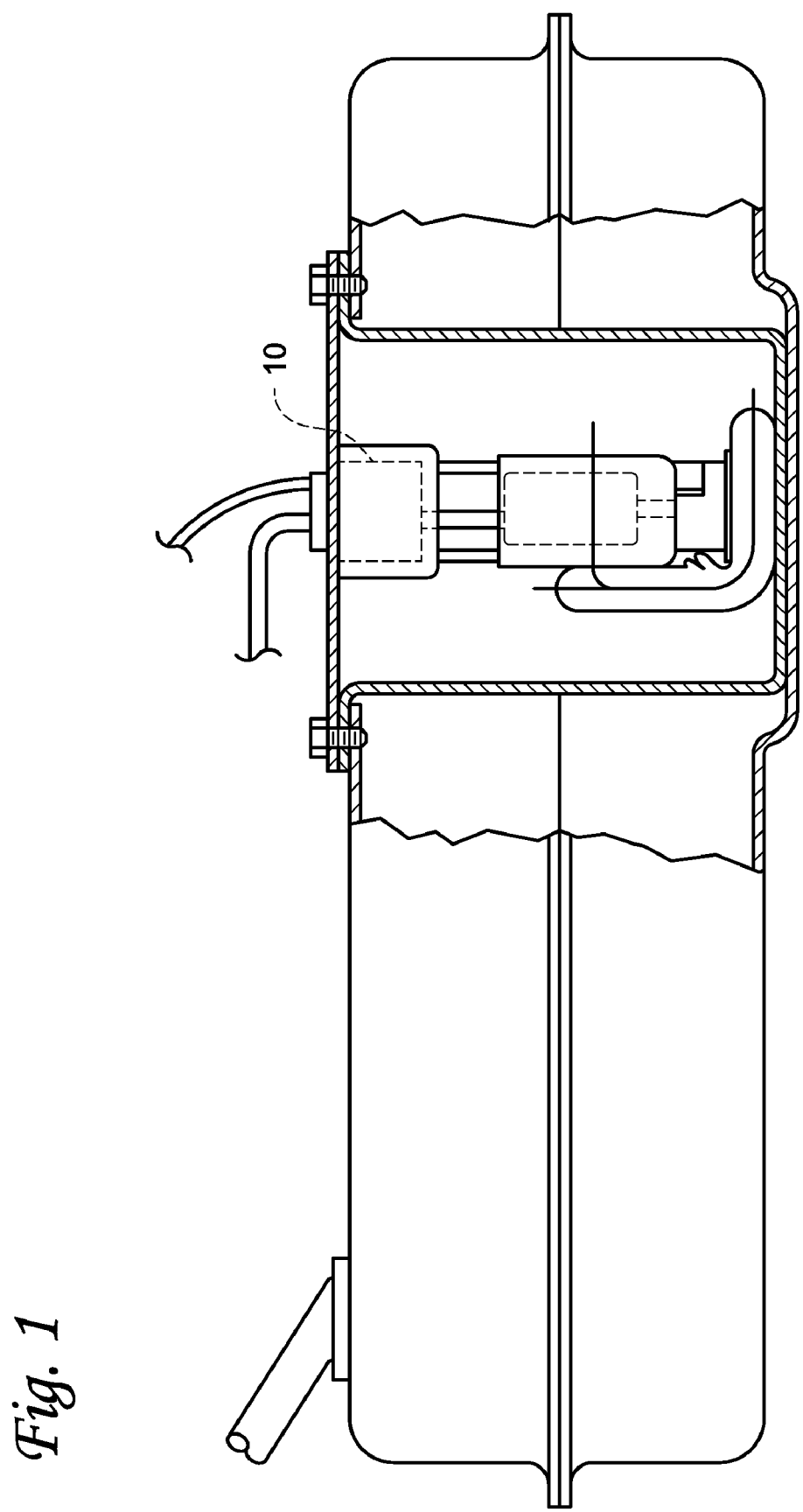

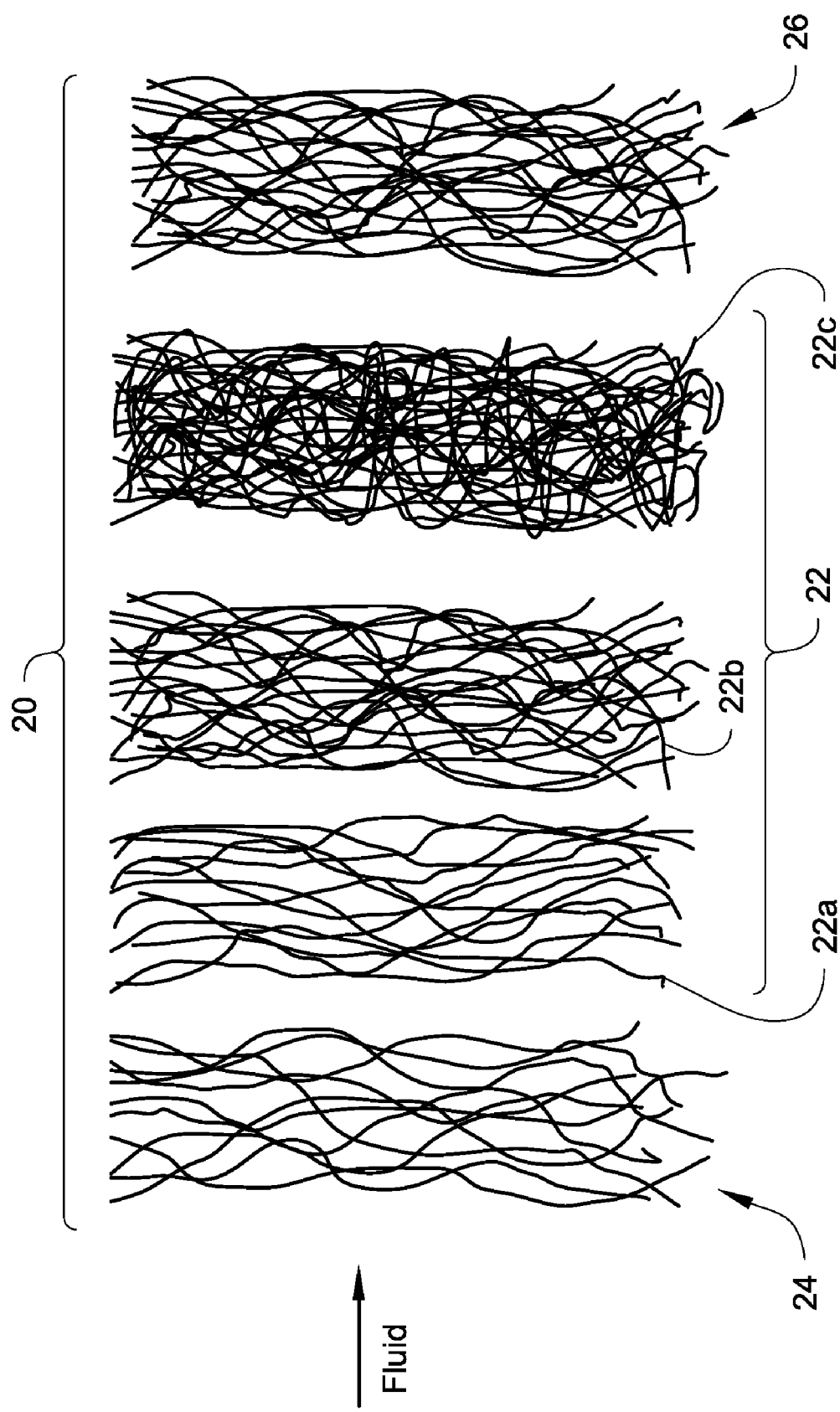

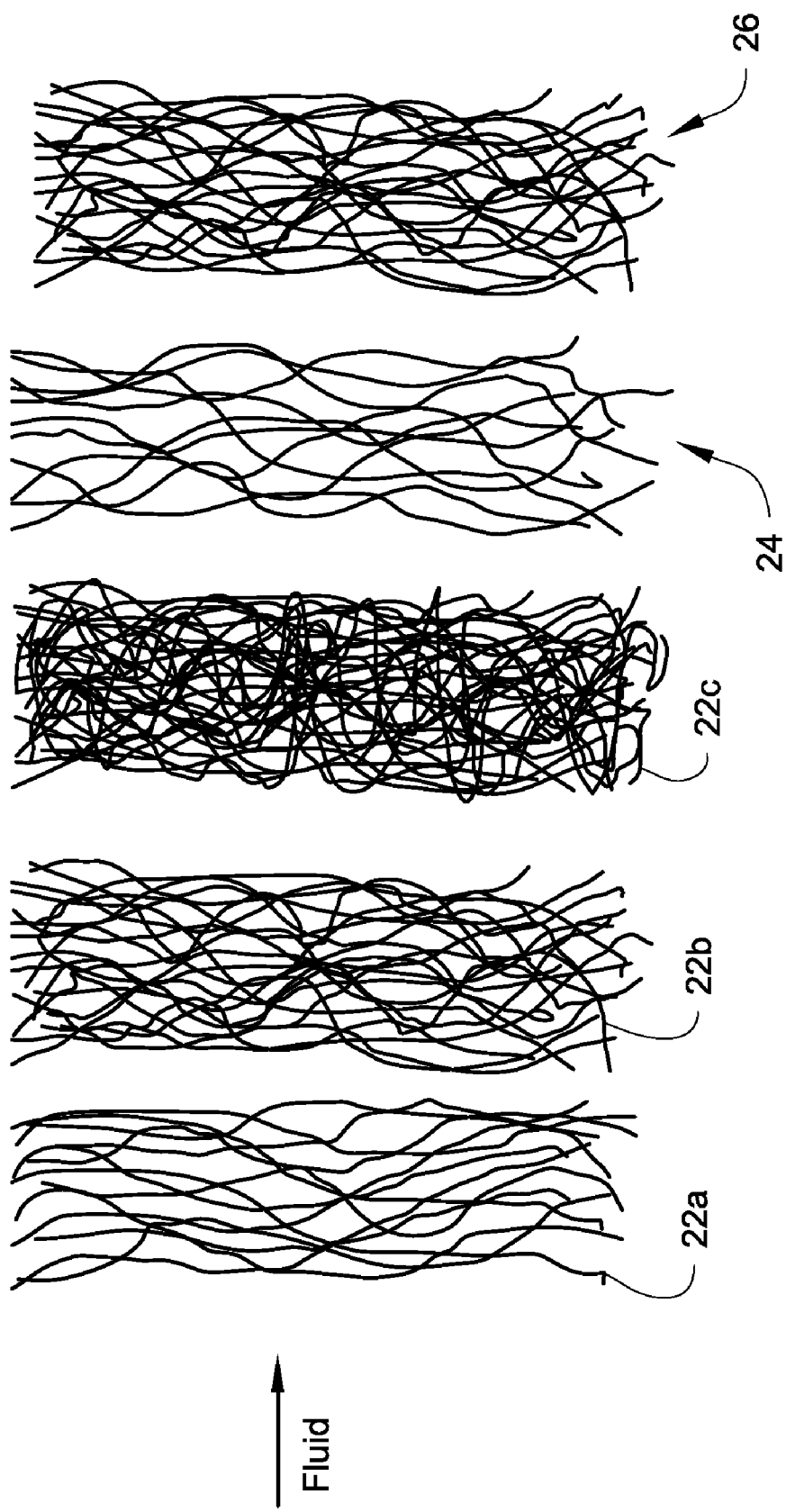

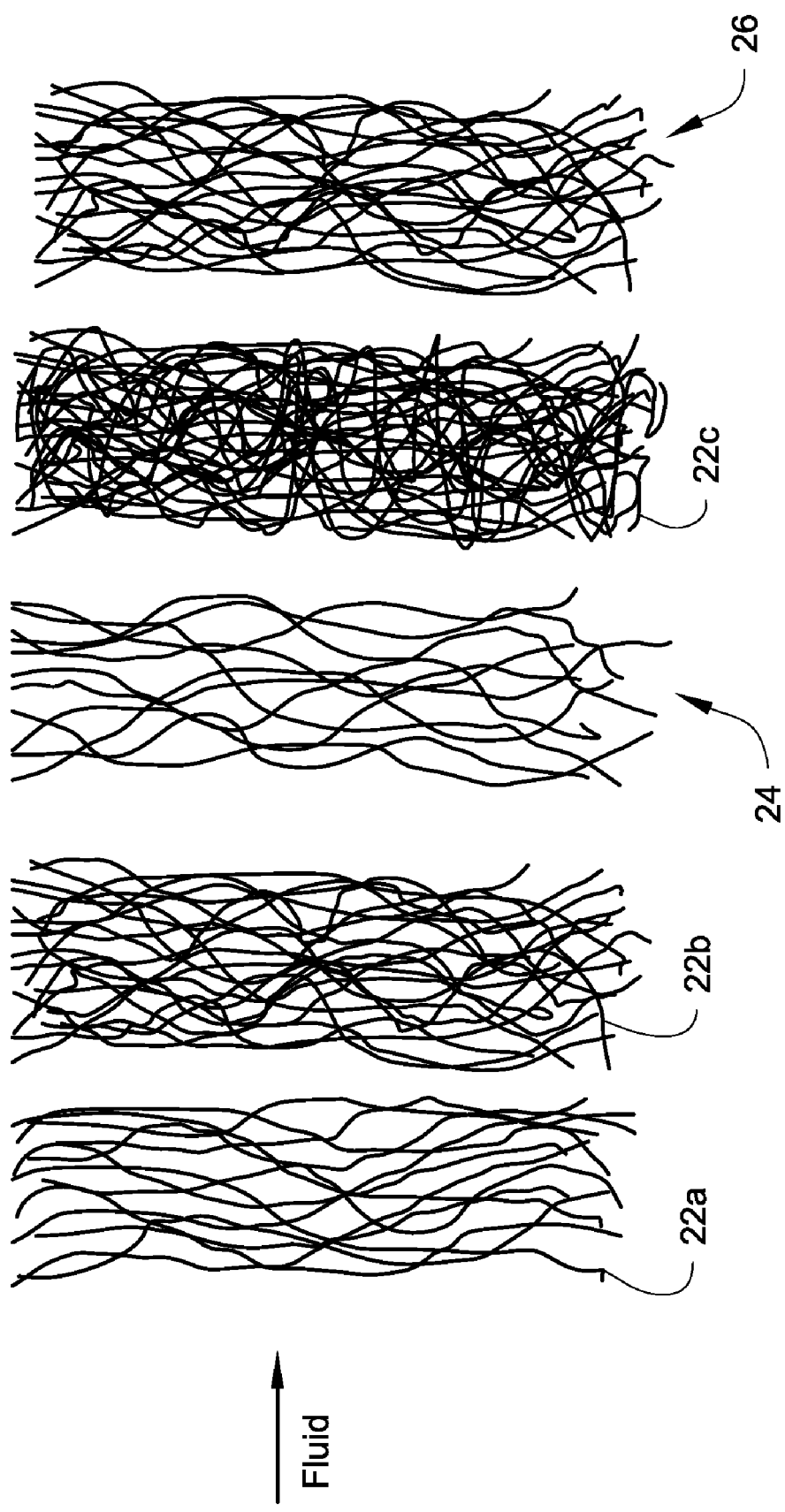

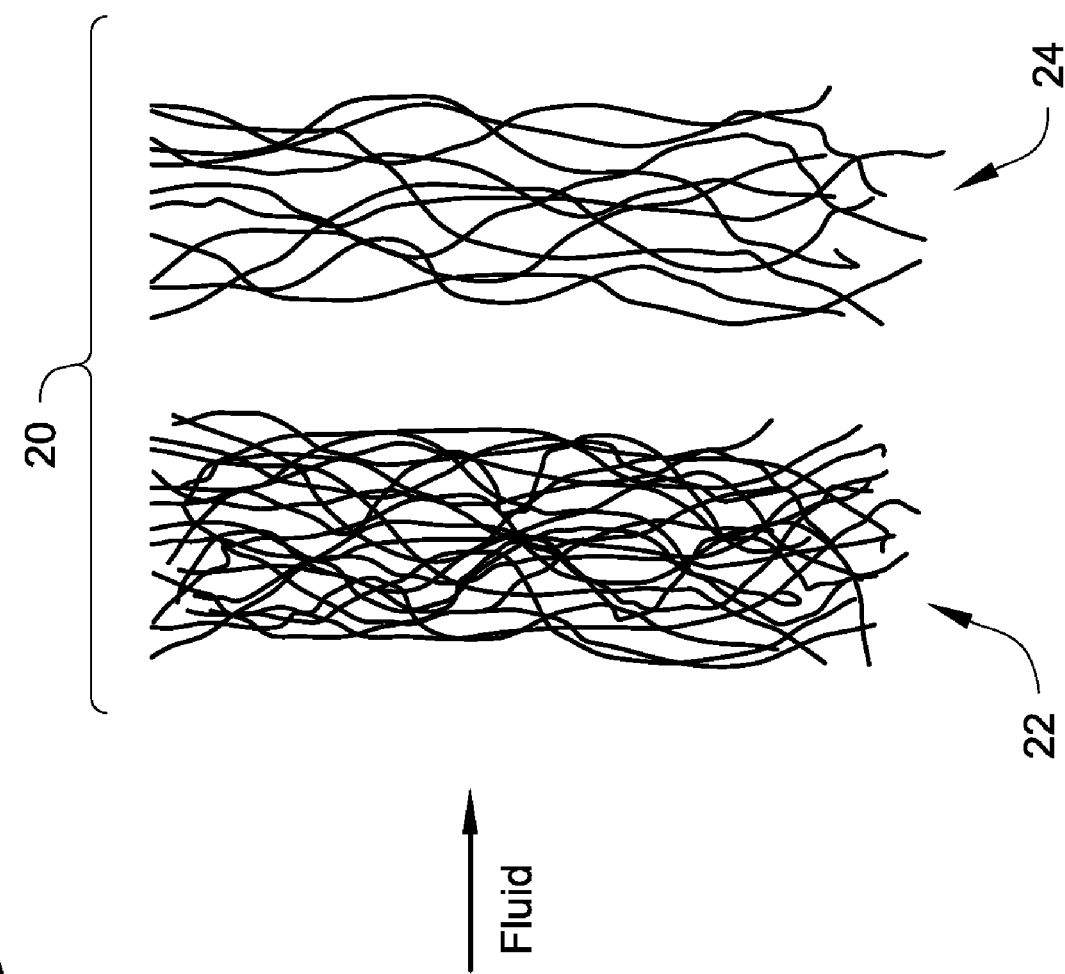

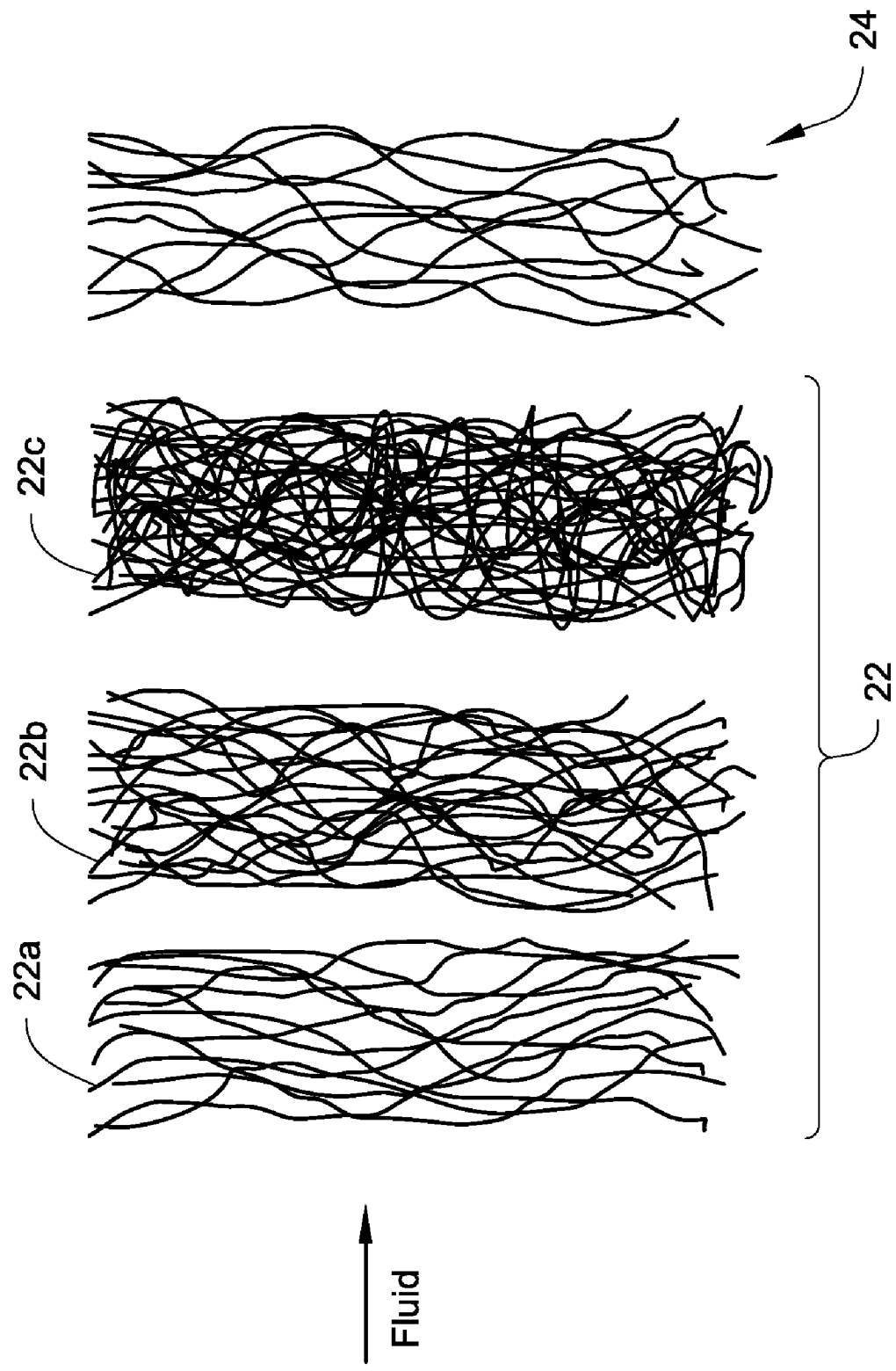

STATIC DISSIPATIVE FILTRATION MEDIA

This application is a continuation of application Ser. No. 12/062,222 filed on Apr. 3, 2008, now U.S. Pat. No. 7,927,400.

FIELD

This disclosure relates to fluid filtration media, and more particularly relates to fluid filtration media designed to dissipate a static charge.

BACKGROUND

In many filtered fluid systems, static charge will build up as the fluid passes through the filter. For example, in fuel systems for motor vehicles and stationary power plant installations, static charge will build up as the fuel passes through the fuel filter. There is a need to dissipate the static charge at the filter so that it will not create a static event such as a spark, which may cause a void in the filter media or a potential safety concern. In prior fuel filters, dissipation of the static charge has been accomplished using a number of methods that require extra components or higher cost materials, thus increasing the cost of the filter.

Alternative, lower cost options for satisfying the static dissipation requirements of fluid filtration media are needed.

SUMMARY

A fluid filtration media is described that incorporates a static dissipative media layer for dissipating the static charge that builds up as a fluid passes through the filtration media. The filtration media can be used for a number of fluids, for example fuel such as unleaded fuel or diesel fuel, hydraulic fluid, lubrication oil, urea and other fluids both liquid and gaseous where static charge build-up is a concern as the fluid passes through the filtration media.

In one embodiment, the filtration media includes a filter media suitable for filtering fluid, and a static dissipative media layer. The static dissipative media layer has a surface resistivity level of between about $1\times10^5$ to $1\times10^{12}$ ohms/sq which classifies the media layer as static dissipative according to the Electrostatic Discharge (ESD) Association. For fuel applications, it is currently believed that the surface resistivity level should be between about $1\times10^5$ to $1\times10^8$ ohms/sq.

In an embodiment, the static dissipative media layer comprises a spun bonded fabric of non-conducting fibers and static dissipative fibers distributed with the non-conducting fibers. The static dissipative fibers can comprise a non-conducting component and a conducting component.

The filter media can be any filter media that is suitable for filtering the fluid in question. In the case of fuel, the filter media can be a depth media comprising a plurality of layers of meltblown media, the layers of meltblown media having varying porosities. When depth filter media is used, the static dissipative media layer is preferably disposed adjacent the filter layer having the greatest electron stripping, i.e. having the lowest porosity.

In certain embodiments, a carrier layer can be provided to support the filter media and the static dissipative media layer.

DESCRIPTION OF THE DRAWINGS

FIG. 1 is a diagrammatic, side elevational view of a motor vehicle fuel tank having a pump module that can incorporate the filtration media described herein.

FIG. 2 is an enlarged, fragmentary sectional view of one embodiment of the filtration media.

FIG. 3 is an enlarged, fragmentary sectional view of another embodiment of the filtration media.

FIG. 4 is an enlarged, fragmentary sectional view of yet another embodiment of the filtration media.

FIG. 5 is an enlarged, fragmentary sectional view of yet another embodiment of the filtration media.

FIG. 6 is an enlarged, fragmentary sectional view of yet another embodiment of the filtration media.

DETAILED DESCRIPTION

The filtration media described herein can be utilized in the filtration of a number of fluids including, but not limited to, fuel such as unleaded fuel or diesel fuel, hydraulic fluid, lubrication oil, urea, and other fluids (both liquid and gaseous) where static charge build up is a concern as the fluid passes through the filtration media. For convenience the filtration media will be described herein as being for use in fuel filtration. To help describe the concepts of the filtration media, FIG. 1 illustrates an in-tank housed fuel module of a motor vehicle in which the filtration media described herein can be used. The filtration media can be incorporated into the in-line filter 10 located at the top side of the fuel module. The construction and operation of in-tank housed fuel modules is well known in the art. Other uses of the filtration media are of course possible, including use in other types of fuel filters, both inside and outside a fuel tank.

Turning to FIG. 2, an embodiment of the filtration media 20 is illustrated. The filtration media 20 includes filter media 22 suitable for filtering fuel, a static dissipative media layer 24, and a carrier layer 26. The direction of fluid flow through the media 20 is illustrated by the arrow.

The filter media 22 can be any media that is suitable for filtering the fluid with which the filtration media 20 is used. In the case of fuel, the filter media 22 can be any of a number of media that are known to those of skill in the art to be sufficient for filtering fuel. For example, the filter media 22 can be a gradient depth filter media comprising a plurality of non-woven layers 22*a*, 22*b*, 22*c* of melt blown filaments. The layers 22*a*-22*c* are preferably arranged by decreasing filament and pore size in the direction of fuel flow to provide graduated filtration of particulate matter. As a result, the layer 22*a* has a first porosity, the layer 22*b* has a lower porosity, and the layer 22*c* has the lowest porosity. Examples of gradient density, melt blown filter media layers are well known in the art, suitable examples of which are disclosed in U.S. Patent Application Publication No. 2006/0266701 and U.S. Pat. No. 6,613,227 which are incorporated herein by reference in their entirety. In an alternative embodiment illustrated in FIG. 5, the filter media 22 is a single layer of filter media.

The static dissipative media layer 24 can be any media that exhibits a static dissipative property. As used herein, the terms static dissipative and static dissipative media refer to that class of materials that are classified as being static dissipative by the ESD Association. According to the ESD Association, a material is classified as being static dissipative when it has a surface resistivity equal to or greater than $1\times10^5 \Omega$/sq but less than $1\times10^{12}\Omega$/sq or a volume resistivity equal to or greater than $1\times10^4$ $\Omega$-cm$^2$ but less than $1\times10^{11}$ $\Omega$-cm$^2$. For static dissipative materials, charges flow to ground more slowly and in a somewhat more controlled manner than with conductive materials. It is important to realize that a material can dissipate static, yet not be classified as static dissipative. A number of materials that would be classified as conductive according to the ESD Association meet this criteria.

In an exemplary embodiment, the static dissipative media layer 24 is a layer of spun bonded fabric media comprising non-conducting resin fibers and static dissipative fibers distributed with the non-conducting fibers. An example of a suitable spun bonded static dissipative fabric is disclosed in U.S. Pat. No. 5,368,913, the entire disclosure of which is incorporated herein by reference. By using a static dissipative media rather than a conductive media, a lower amount of conducting fibers need to be used in the static dissipative media which lowers the cost of the static dissipative media.

The spun bonded fabric used for the layer 24 preferably has a weight of about 0.5-0.6 ounce per square yard, and the ratio of static dissipative fibers to non-conducting fibers is 1:5 or more. For fuel filters used to filter fuel, the surface resistivity level of the spun bonded fabric is between about $1\times10^5$ to $1\times10^8$ ohms/sq, and the static dissipative fibers have a surface resistivity level of between about $1\times10^5$ to $1\times10^8$ ohms/sq.

The static dissipative fibers can comprise single component materials such as carbon or metallic fibers. In appropriate circumstances, carbon or metallic powder or particles could be used, as could inherently dissipative polymers.

In another embodiment, the static dissipative fibers can comprise a non-conducting component and a conducting component. This multi-component construction can provide added strength over use of a single component conducting filament. Preferably, the multi-component fiber would have a solid conducting material located on the surface of a fiber, such as a fiber with a conducting filament alongside a non-conducting filament. The fibers may be also be constructed entirely from a conducting component, or they may incorporate a bicomponent polymer with a base polymer filled with an external solid of conducting material, such as a stripe (or stripes), a sheath, or a combination thereof. At the time of filing this application, it is believed to be unacceptable for the conducting material to be a core or offset core of material. An offset core is where conducting material is encapsulated within non-dissipative material but is not centered within the non-dissipative material. With the core and offset core, the surface of the fiber is not dissipative, just the cut end where the conducting material is exposed.

In the case of fuel applications, the static dissipative layer 24 is not generally considered as contributing to the filtering capability of the filtration media 20. However, if the size of particulates in the fuel is large enough, those particulates may be removed by the static dissipative layer 24.

Although a single static dissipative layer 24 is illustrated, one or more additional static dissipative layers can be utilized. In addition, the static dissipative layer 24 can be layered in different formations from that shown in FIG. 2. For example, when used with depth filtration media, it is recommended to have the static dissipative layer 24 adjacent to the source of highest electron stripping, i.e. at the filter layer with the smallest pore size. This is illustrated in FIG. 3 which shows the static dissipative layer 24 adjacent to and downstream from the layer 22c, and in FIG. 4 which shows the static dissipative layer 24 adjacent to and upstream from the layer 22c.

It is to be noted that although there are gaps shown between the layers in the figures, this is for convenience in describing the filtration media 20. In actual practice, there will be no (or at least minimal) gaps between the various layers. The static dissipative layer 24 can be co-rolled with the filter layers 22a-22c and bound thereto using heat, mechanical weld, glue or binding agent. Likewise, the filter layers 22a-22c can be bound to the carrier layer 26 using heat, mechanical weld, glue or binding agent.

The carrier layer 26 can be any media suitable for acting as a carrier structure for the filter media 22. Preferably, the carrier is a non-woven cellulose material. However, other carriers such as woven fabrics, extruded and wire mesh screens, and the like can be used. In certain embodiments the carrier 26 is not required. For example, as illustrated in FIG. 6, the carrier 26 can be eliminated if the filter media 22 can be configured to be self-supporting such as by the use of a molding, for example a plastic molding, connected to the media or pleating the filter media 22.

The static dissipative layer 24 is used as a pathway for static charge to flow out of the filter to a grounding point. The static dissipative layer 24 will be connected to a suitable conducting structure. The conducting structure will depend, in part, on the environment in which the filter is used. For an in-tank filter, the static dissipative layer can be connected to ground via the fuel pump or through use of conductive or static dissipative plastics or grounding wires or clips or pins that connect to the media. Alternatively, the static dissipative layer can be connected to ground via a conducting end cap of the housing in which the fuel filter is disposed similar to that disclosed in U.S. Pat. No. 6,099,726.

The filtration media described herein may be embodied in other forms without departing from its spirit or characteristics. The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. Filtration media comprising a plurality of media layers, at least one of the media layers being a filter media suitable for filtering fluid; and at least one, but not all, of the media layers being a static dissipative media layer, the static dissipative media layer having a surface resistivity level of between about $1\times10^5$ to $1\times10^{12}$ ohms/sq.

2. The filtration media of claim 1, wherein the static dissipative media layer comprises a spun bonded fabric of non-conducting fibers and conducting fibers distributed with the non-conducting fibers.

3. The filtration media of claim 2, wherein the conducting fibers comprise static dissipative fibers.

4. The filtration media of claim 3, wherein the ratio of static dissipative fibers to non-conducting fibers is 1:5 or more.

5. The filtration media of claim 3, wherein the static dissipative fibers comprise:
a non-conducting component and a conducting component, the conducting component is located on the surface of the static dissipative fibers; or
a bicomponent polymer with a base polymer filled with an external solid of conducting material.

6. The filtration media of claim 3, wherein the surface resistivity level is between about $1\times10^5$ to $1\times10^8$ ohms/sq, and the static dissipative fibers have a surface resistivity level of between about $1\times10^5$ to $1\times10^8$ ohms/sq.

7. The filtration media of claim 1, wherein the filter media is configured for filtering fluid selected from the group consisting of fuel, hydraulic fluid, lubrication oil, urea and other fluids in which a static charge can build-up as the fluid passes through the filtration media.

8. The filtration media of claim 1, wherein the filter media comprises a plurality of layers of meltblown media, the layers of meltblown media having varying porosities and being arranged to provide gradient density depth filtration; and the static dissipative media layer is disposed adjacent to one of the meltblown media layers.

9. The filtration media of claim 8, wherein the static dissipative media layer is disposed adjacent to the meltblown media layer having the lowest porosity.

10. The filtration media of claim 1, wherein one of the media layers comprises a carrier layer.

11. The filtration media of claim 10, wherein the carrier layer comprises a cellulose material.

12. The filtration media of claim 1 comprising multiple static dissipative media layers.

13. The filtration media of claim 8, wherein the static dissipative media layer is disposed adjacent to the meltblown media layer having the highest porosity.

14. A fuel filter comprising a plurality of media layers, at least one of the media layers being a filter media suitable for filtering fuel; and at least one, but not all, of the media layers being a static dissipative media layer, the static dissipative media layer having a surface resistivity level of between about $1\times10^5$ to $1\times10^8$ ohms/sq.

15. The fuel filter of claim 14, wherein the static dissipative media layer comprises a spun bonded fabric of non-conducting fibers and conducting fibers distributed with the non-conducting fibers.

16. The fuel filter of claim 15, wherein the conducting fibers comprise static dissipative fibers.

17. The fuel filter of claim 16, wherein the ratio of static dissipative fibers to non-conducting fibers is 1:5 or more.

18. The fuel filter of claim 16, wherein the static dissipative fibers comprise:
 a non-conducting component and a conducting component, the conducting component is located on the surface of the static dissipative fibers; or
 a bicomponent polymer with a base polymer filled with an external solid of conducting material.

19. The fuel filter of claim 16, wherein the static dissipative fibers have a surface resistivity level of between about $1\times10^5$ to $1\times10^8$ ohms/sq.

20. The fuel filter of claim 14, wherein the filter media comprises a plurality of layers of meltblown media, the layers of meltblown media having varying porosities and being arranged to provide gradient density depth filtration; and the static dissipative media layer is disposed adjacent to one of the meltblown media layers.

21. The fuel filter of claim 20, wherein the static dissipative media layer is disposed adjacent to the meltblown media layer having the lowest porosity.

22. The fuel filter of claim 14, wherein one of the media layers comprises a carrier layer.

23. The fuel filter of claim 22, wherein the carrier layer comprises a cellulose material.

24. The fuel filter of claim 14 comprising multiple static dissipative media layers.

25. The fuel filter of claim 20, wherein the static dissipative media layer is disposed adjacent to the meltblown media layer having the highest porosity.

26. A method of dissipating static charge that results from fuel passing through a fuel filter media of a fuel filter, wherein the fuel filter media is a multi-layer media, comprising incorporating a static dissipative media layer into the fuel filter adjacent to the fuel filter media, the static dissipative media layer having a surface resistivity level of between about $1\times10^5$ to $1\times10^8$ ohms/sq.

27. The method of claim 26, wherein the fuel filter media is multi-layer depth media, the layers including a layer having the greatest electron stripping when compared to the electron stripping of the other layers, and comprising incorporating the static dissipative media layer adjacent to the layer of the depth media having the greatest electron stripping.

28. The method of claim 26, comprising connecting the static dissipative layer to a conducting structure when the fuel filter is in use.

29. The method of claim 26, wherein the fuel filter media is multi-layer depth media comprising a plurality of layers of media having varying porosities, and comprising incorporating the static dissipative media layer adjacent to the layer having the highest porosity.

\* \* \* \* \*